United States Patent [19]

Fox

[11] Patent Number: 5,414,203
[45] Date of Patent: May 9, 1995

[54] TREATMENT OF PARTICULATE MATERIAL CONTAMINATED WITH POLYHALOGENATED AROMATICS

[75] Inventor: Robert D. Fox, Loudon, Tenn.

[73] Assignee: International Technology Corporation, Torrance, Calif.

[21] Appl. No.: 676,896

[22] Filed: Mar. 28, 1991

[51] Int. Cl.⁶ ............................................. B01D 49/00
[52] U.S. Cl. ..................... 588/207; 588/209; 588/213; 588/248; 423/659
[58] Field of Search ............ 423/659; 208/262.5; 405/128; 588/207, 209, 213, 248

[56] References Cited

U.S. PATENT DOCUMENTS

| | | | |
|---|---|---|---|
| 2,217,836 | 10/1940 | Dierichs | 260/629 |
| 3,437,696 | 4/1969 | Achard et al. | 260/613 |
| 3,585,243 | 6/1971 | Gradoff | 260/613 |
| 3,686,337 | 8/1972 | Chang | 260/650 R |
| 3,855,337 | 12/1974 | Foral, Jr. et al. | 260/674 R |
| 4,246,255 | 1/1981 | Grantham | 423/659 |
| 4,284,516 | 8/1981 | Parker et al. | 210/757 |
| 4,326,090 | 4/1982 | Smith et al. | 585/469 |
| 4,327,027 | 4/1982 | Howard et al. | 260/340.3 |
| 4,337,368 | 6/1982 | Pytlewski et al. | 568/730 |
| 4,351,718 | 9/1982 | Brunelle | 208/262 |
| 4,351,978 | 9/1982 | Hatano et al. | 585/469 |
| 4,353,793 | 10/1982 | Brunelle | 208/262 |
| 4,377,471 | 3/1983 | Brown et al. | 208/262 |
| 4,379,746 | 4/1983 | Norman et al. | 208/262 |
| 4,400,552 | 8/1983 | Pytlewski et al. | 568/715 |
| 4,402,274 | 9/1983 | Meenan et al. | 110/346 |
| 4,410,422 | 10/1983 | Brunelle | 208/262 |
| 4,430,208 | 2/1984 | Pytlewski et al. | 208/262 |
| 4,447,667 | 5/1984 | Parker et al. | 585/469 |
| 4,460,797 | 7/1984 | Pytlewski et al. | 568/715 |
| 4,477,354 | 10/1984 | Fessler | 210/634 |
| 4,509,434 | 4/1985 | Boday et al. | 110/238 |
| 4,532,028 | 7/1985 | Peterson | 208/262 |
| 4,574,013 | 3/1986 | Peterson | 134/2 |
| 4,581,130 | 4/1986 | Globus | 208/262 |
| 4,632,742 | 12/1986 | Tundo | 204/158.21 |
| 4,663,027 | 5/1987 | Mendiratta et al. | 208/262 |
| 4,748,292 | 5/1988 | Mendiratta | 585/469 |
| 4,839,042 | 6/1989 | Tumiatti et al. | 210/194 |
| 5,019,175 | 5/1991 | Rogers et al. | 134/42 |
| 5,055,196 | 10/1991 | Darian et al. | 210/638 |

FOREIGN PATENT DOCUMENTS

| | | | |
|---|---|---|---|
| 0144216 | 6/1985 | European Pat. Off. | 208/262 |
| 3610199 | 10/1987 | Germany | 423/659 |

OTHER PUBLICATIONS

The Polyglycol Handbook, Dow Chemical Co., (Date Unknown)).
Dowanol Glycol Ethers, Dow Chemical Co., (Date Unknown)).

Primary Examiner—Gary P. Straub
Assistant Examiner—Timothy C. Vanoy
Attorney, Agent, or Firm—Luedeka, Neely & Graham

[57] ABSTRACT

The specification discloses a method for the treatment of particulate material contaminated with polyhalogenated aromatic compounds (PHAs). The method includes vaporizing the PHAs from the material and dissolving the vaporized PHAs in a glycol-based solvent solution. The PHAs are then removed from the solution so that the glycol can be reused.

11 Claims, 1 Drawing Sheet

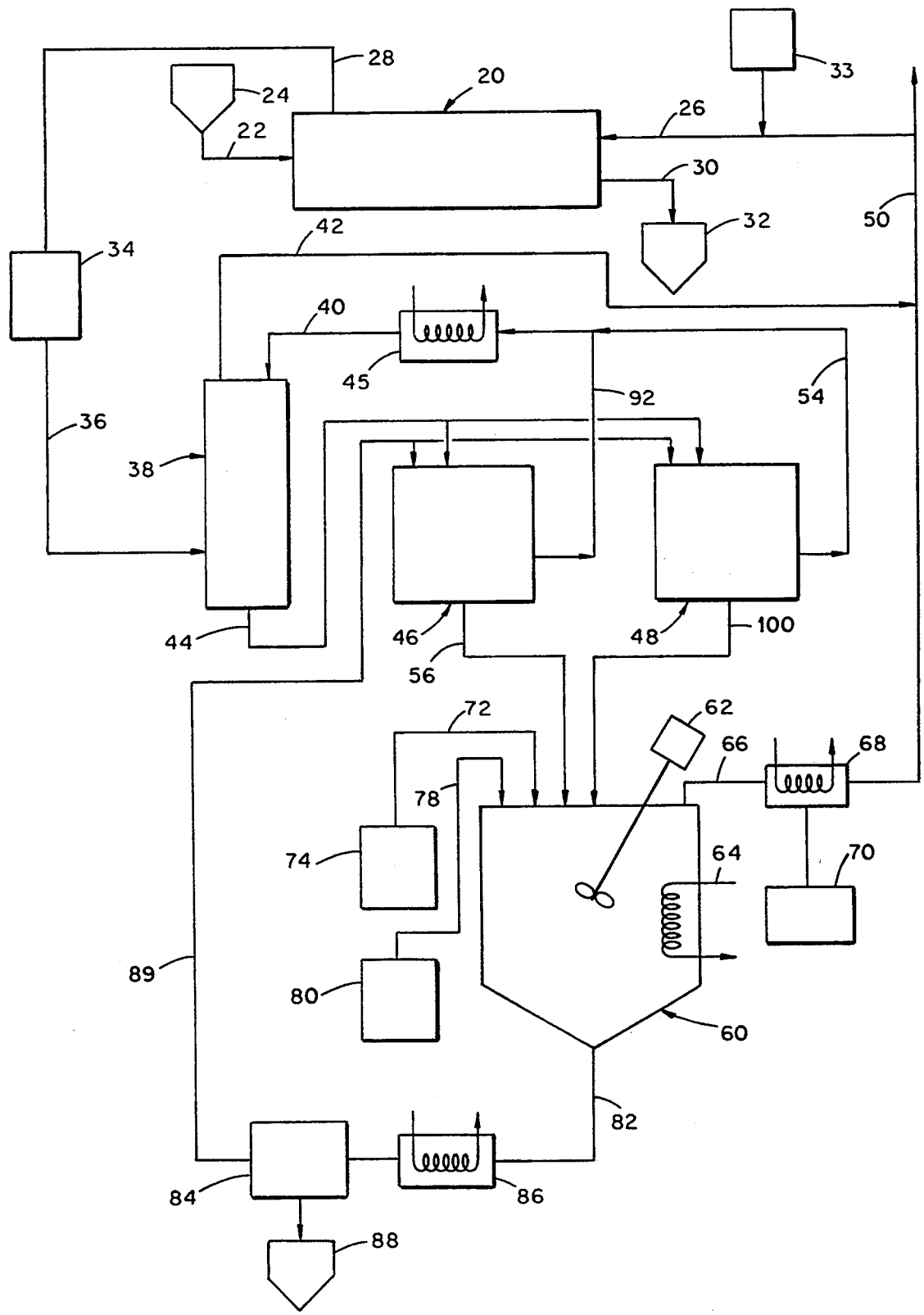

TREATMENT OF PARTICULATE MATERIAL CONTAMINATED WITH POLYHALOGENATED AROMATICS

The present invention relates to methods for the treatment of particulate materials contaminated with organic compounds and more particularly related to a method for the treatment of particulate material contaminated with polyhalogenated aromatic compounds.

Considerable effort is now being expended toward the goal of developing techniques and procedures for dealing with the problem of environmental pollution. In addition to those activities related to minimizing or avoiding the release of hazardous or toxic substances into the environment, there is a great deal of activity concerned with the decontamination of existing sites that are contaminated with various organic compounds and mixtures. Many of these sites require the treatment of particulate materials such as soil, solids, and/or sludges which have been contaminated with a class of organic compounds typically referred to as polyhalogenated aromatic compounds or PHAs, e.g., polychlorinated biphenyls (PCBs) and chlorinated dioxins. A conventional approach for the decontamination of such materials is to destroy the PHAs by subjecting the material to very high temperatures in a roasting kiln and/or in a post-kiln secondary combustion unit. While thermal destruction methods of this type are effective in many cases, they consume copious amounts of energy and the gas treatment equipment tends to be very large, inconvenient to transport and difficult to operate. Also, as with most processes that involve heating PHAs to a significate degree, there is a risk of producing undesirable by-products such as PCDDs or PCDFs which may escape subsequent gas treatment steps and be released into the atmosphere.

Accordingly, it is an object of the present invention to provide a method for the treatment of particulate matter contaminated with PHAs to significantly reduce the concentration of PHAs within the material.

Another object of the invention is to provide a method of the character described which is carried out under relatively low temperature conditions to minimize the formation of undesirable PHA reaction by-products.

A further object of the invention is to provide a method for the treatment of particulate material contaminated with PHAs wherein the release of PHAs or any undesirable PHA reaction by-products to the environment is avoided.

Yet another object of the invention is to provide a method for the treatment of particulate matter contaminated with PHAs wherein the processing conditions are relatively mild to avoid the expense and complexity associated with known techniques.

Still another object of the invention is the provision of a method of the character described wherein the PHAs are vaporized from the particulates at relatively low temperatures and are dissolved within an organic solvent which is substantially miscible with water to provide essentially a single liquid phase containing the PHAs.

Still a further object of the invention is to provide a method of the character described wherein the PHAs contained within the solvent are destroyed by contacting the solvent with a reagent that leaves the solvent substantially unaffected so that it can be reused.

The present invention relates to a method for the treatment of particulate material contaminated with PHAs which comprises vaporizing the PHAs from the material, collecting the vaporized PHAs within a carrier gas, and contacting the carrier gas containing the vaporized PHAs with a solvent solution containing a glycol of the general formula

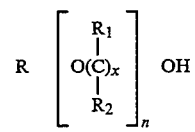

wherein x is $\geq 2$ and n is an integer of 2 to 400; R is hydrogen, a straight or branched-chain $C_1$-$C_{20}$ alkyl, aralkyl or acyl group; $R_1$ and $R_2$ are the same or different and are hydrogen, straight or branched-chain alkyl, unsubstituted or substituted by $C_5$-$C_8$ cycloalkyl or aryl group, and wherein the contacting takes place under conditions such that the PHAs are condensed from the gas and dissolved in the glycol in the solution, and thereby separated from the carrier gas. Preferred glycols for use in the solvent solution employed in the invention include polyglycols and glycol ethers which are co-miscible with the PHA and with water, which have a relatively low vapor pressure and a relatively low viscosity, and which have a terminal hydroxyl group to facilitate in-situ reaction of the PHAs to permit their destruction and removal from the solution in an advantageous manner so that the solution can be reused.

Polyglycols (also referred to as polyethylene glycols or PEGs) are described by the following general formulation:

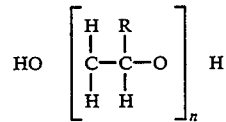

where R is hydrogen or a substituted or unsubstituted alkyl group and n designates the average number of alkylene oxide groups in the molecule.

Generally speaking, the polyglycols are designated by the terminology PEG220, PEG300, PEG400 and so on with the numerical portion of the designation representing the average molecular weight of the polymer chain. Particularly preferred PEGs for use in the invention fall in the range of PEG200 to PEG600, with PEG400 representing what is believed to be an optimal material in terms of its viscosity, miscibility and vapor pressure under the conditions employed.

Glycol ethers (polyethers) that may be used in the solvent solution are prepared by the reaction of an alkylene oxide with an alcohol to produce the desired glycol ether, which may be reacted with additional alkylene oxide to produce higher homologs. A preferred polyether for use in the invention is triethylene glycol methyl ether, or $CH_3(O-C_2H_4)_3OH$, which has favorable viscosity, miscibility and vapor pressure characteristics under the conditions employed in the process.

A significant advantage associated with the invention is that the glycols are substantially miscible with water and they readily dissolve PHAs so that essentially a single liquid phase will be present. The glycols also have a relatively low vapor pressure so that the solution can be used to simultaneously perform multiple functions of cooling, condensing and scrubbing in connection with separation of condensed PHAs from the carrier gas without undue loss of the glycols due to volatilization.

The use of glycols containing a terminal hydroxyl group facilitates removal of PHAs from the solution by in-situ destruction of condensed PHAs separated from the gas. In accordance with a preferred embodiment of the invention, the PHAs in the glycol solution are removed by contacting the solution with a reagent selected from the class consisting of alkali metal hydroxides and alkali metal alkoxides under conditions such that the PHAs are destroyed, leaving halogen ions in the solution as destruction products. The halogen ions are then separated from the solution by precipitation as a salt in combination with the alkali metal ion. The PHA destruction reaction has no significant adverse affect on the glycol component so that it can be reused many times.

The particulate material often contains a considerable amount of water which is evaporated from the material with the PHAs. A further advantage of the invention is that the glycol solution, being miscible with water, readily accepts any water that may be condensed with the PHAs to retain the essentially homogeneous nature of the solution. This avoids the development of multiple liquid phases which can lead to the formation of undesirable emulsions and other problems during the turbulent conditions often associated with gas/liquid contacting procedures. Any water that is collected is preferably removed prior to addition of the PHA destruction reagent by heating the solution to about 120° C. before the reagent is added.

BRIEF DESCRIPTION OF THE DRAWING

The invention will now be further described with reference to the drawing which illustrates various aspects of a process according to one embodiment of the invention. Initially, it should be noted that the process flow diagram of the drawing is simplified for ease of explanation and many conventional components such as valves, controls, regulators, pumps and piping and flow details and arrangements are omitted for the purpose of clarity. It is assumed that those of ordinary skill in the art will readily adapt such of these items and components as are necessary for use in the process.

In the illustrated embodiment, the initial step involving vaporization of the PHAs from the particulate material is carried out by thermal desorption using a rotary kiln illustrated generally at 20. The kiln 20 is an apparatus that is particularly well suited for the treatment of particulate material such as soils, organic solids, sludges and other similar grainy-type materials.

In general, the kiln 20 is an elongate tubular enclosure which is powered for rotation about its longitudinal axis, and is configured to cause the material to be advanced form one end to the other while being subjected to a heating and mixing process. Preferably the kiln 20 is heated indirectly, that is, the heat is supplied through the exterior walls so that the material and gases within the kiln are not exposed to direct flame or combustion conditions. Such a system and its operation in a process of thermal desorption is disclosed in the Assignee's U.S. Pat. No. 4,961,391 entitled "Thermal Treatment Process for Organically Contaminated Material" which issued Oct. 9, 1990 incorporated herein by reference as if fully set forth.

The particulates are fed through conduit 22 into one end of the kiln 20 from a supply such as a hopper or bin 24. As the material progresses through the kiln 20, PHAs along with other volatile components such as water are vaporized. The vapor is swept from the kiln by a carrier gas admitted through conduit 26 and the resulting mixture is directed from the kiln 20 through exhaust conduit 28.

The treated particulate material is discharged from the kiln 20 through conduit 30 and is collected such as in a receptacle 32 for eventual return to the environment, or it may be fed directly to a land fill or other disposal site. The kiln 20 is operated in such a manner as to cause a reduction in the concentration of PHAs to a level acceptable for handling and disposal of the material as a non-toxic hazardous substance. For most purposes, this is accomplished by maintaining a temperature within the kiln of from about 300° C. to about 600° C. and insuring a residence time of the material within the kiln of from about 5 to about 60 minutes.

The carrier gas admitted to the kiln 20 in conduit 26 is preferably substantially inert, e.g., nitrogen or a low oxygen content combustion gas obtained from a source such as a tank or nitrogen plant, or from a combustion box, the source being indicated generally at 33. The use of an inert carrier gas helps avoid conditions that may favor the production of undesirable by-products or side reactions as a result of the heating of the PHAs.

The gas mixture leaving the kiln 20 in exhaust conduit is first directed to a particulate removal system 34 such as a series of heated cyclones, for example, where any particulate carryover from the kiln 20 is substantially removed. The gas is then directed via conduit 36 to a quench/condenser/scrubber system (QCS system) indicated at 38 where the gas is intimately mixed with a wash solution containing a glycol solvent for the PHAs as described above. The QCS system 38 may be provided by an arrangement of spray chambers, venturis, cyclone separators, packed columns, demisters and other gas/liquid contacting and separating devices as may be appropriate under the circumstances depending on the volume that is to be handled, space limitations, economic considerations and other factors.

The PEG solution enters the system 38 via feed conduit 40 at a temperature sufficiently high to enable pumping of the solution and formation of a scrubbing spray or mist to achieve the necessary contact between the gas and the solution. In the case of PEG400, a temperature of about 55° C. will generally be adequate for this purpose. Contact between the gas and the cooler glycol solution causes a substantial decrease in the gas temperature resulting in condensation of PHAs and water, which are stripped from the gas by contact with the spray with the assistance of gas/liquid separation devices within the system. The liquid is collected in a suitable receptacle and directed from the QCS system 38 in conduit 44.

It is again noted that the condensed PHAs are readily dissolved within the glycol under the conditions employed in the QCS system 38. The glycol also is substantially miscible with any water that is condensed in the QCS system 38 as a result of the cooling of the gas. Accordingly, there will exist in the mixture that is directed from the QCS system 38 essentially a single liquid phase typically containing a small concentration of dispersed particulates which escape collection in the particulate removal system 34.

The gas of reduced PHA concentration is directed from the QCS system in conduit 42 and may be released to the environment via conduit 50, recycled to the kiln 20 via conduit 26, or further treated as may be necessary so that it can be safely discharged.

The PEG solution is directed to the QCS system 38 via feed conduit 40 from a batch of solution contained in one of a plurality of tanks 46 and 48, say tank 46. After accepting condensed PHAs and water from the gas passing through the system, the solution is returned to the tank from which it is being drawn. Under stead-state conditions, the temperature increase in the solution passing through the QCS system 38 is balanced by cooling the solution delivered to the QCS system 38 from tank 46 using a heat exchanger 45 in conduit 40, so that the heat absorbing capacity of the solution is insured.

As the glycol is circulated through the QCS system 38 to and from the tank 46, the concentration of PHAs and water in the solution gradually increases. This concentration is monitored either continuously or on a periodic basis and when it reaches a certain level, flow from the tank 46 to feed conduit 40 is discontinued and a fresh supply of solution to feed conduit 40 is established from one of the other tanks, such as tank 48, via conduit 54. At this time, return flow in conduit 44 to tank 46 is continued until an appreciable drop in PHA concentration occurs. Then, return flow from conduit 44 to tank 46 is diverted to tank 48 by a suitable switching valve and recirculating of the solution is continued thereafter to and from tank 48. This allows the treatment of gas in the QCS system 38 to continue uninterrupted while a fresh batch of glycol solution is placed on line.

After the return flow of glycol solution in conduit 44 is diverted to tank 48, the contents of tank 46 are directed via conduit 56 to a treatment vessel 60, which is equipped with agitating means such as stirrer 62 along with heating means indicated at 64. In the vessel 60, the solution is heated at a temperature of about 120° C. to about 140° C. for a period of time sufficient to evaporate substantially all of the water from the solution. The water vapor is withdrawn from the vessel 60 in conduit 66 to a condenser 68 where it is condensed and collected as a liquid in tank 70 for such further treatment as may be necessary for safe disposal in accordance with applicable guidelines and regulations. The uncondensed components of the vapor stream pass from condenser 68 through conduit 50 for release to the atmosphere or further treatment as may be necessary to comply with applicable regulations.

After the water is removed from the glycol solution in the vessel 60, a reactant is added via conduit 72 from a supply 74 to remove the PHA from the solution by in-situ destruction of the PHA compounds, and enable recovery of the halogen components of the PHAs in the form of salts. A preferred reactant for this purpose is selected from the class consisting of alkali metal hydroxides and alkali metal alkoxides which react with the PHAs in the presence of the glycol in such a manner as to cause the PHAs to be destroyed, leaving halogen ions and alkali metal ions in the solution with the glycol remaining substantially unaffected. Potassium hydroxide is a particularly preferred reactant for this purpose and it is preferably delivered to the vessel in a solid form as flakes, pellets, etc., or a non-aqueous solution. Sodium hydroxide may also be used. Alkali metal alkoxides which may be used include potassium t-butoxide, sodium methoxide, sodium ethoxide, sodium n-propoxide, and sodium and potassium iso-propoxides, iso-butoxides and sec-butoxides.

The quantity of the reactant is sufficient to provide a slight stoichiometric excess over that which is theoretically required for reaction with the PHAs. The resulting mixture is heated in the vessel 60 at a temperature of about 150° C. and for a period of at least about 20 minutes to ensure a reduction in the PHA concentration of the solution of an acceptable level.

After the PHA destruction reaction in vessel 60 is completed, a neutralization reagent (preferably a mineral acid such as sulfuric or phosphoric acid) is added to the glycol solution via conduit 78 from a source to bring the PH of the solution down to about 7 and precipitate the salts.

The solution containing the precipitated salt is directed from vessel 60 via conduit 82 to a solid-liquid separation system 84 where the solution is substantially cleared of any solids. Preferably, the solution is cooled to a temperature of about 30° C. to 40° C. by a heat exchange device 86 before delivery to the system 84 to promote the separation process.

The separation system 84 may employ any conventional separation technique such a sedimentation, centrifugation or filtration and may be a continuous or batch process. The separated salts together with any other solids collected from the liquid are removed from the device 84 by solids handling system 88 such as a screw conveyor or like apparatus for drying or further processing as may be required. The salt will typically contain ingredients common to fertilizers and it may be applied directly to the particulate material delivered out of the kiln 20 as a nutrient for supporting the growth of vegetation. The restored glycol solution is returned from system 84 to the tank 46 in conduit 89 and placed on stand-by for use in collecting PHAs from the gas in the QCS system 38.

When the glycol solution that is being recirculated to and from tank 48 reaches the predetermined PHA concentration, flow from tank 48 to conduit 40 is discontinued. The supply of liquid to conduit 40 is switched so as to draw via conduit 92 from a tank containing a fresh supply of glycol solution with a reduced PHA concentration such as the previously restored solution in tank 46. At this time, the concentration of PHAs in the liquid flowing in the return conduit 44 to tank 48 is continued until an appreciable drop in the PHA concentration occurs. Return flow from the QCS system 38 is then diverted to tank 46 from which the restored glycol solution is being drawn. Again, treatment of the gas delivered to the QCS system 38 continues uninterrupted.

After flow to and from tank 46 is established, the now "off line" solution in tank 48 is directed to treatment vessel 60 via conduit 100 and is treated to remove water and PHAs by the procedures described above. The treated and restored glycol solution is then returned to tank 48 in conduit 89 and placed on standby for use when the solution being recirculated to and from tank 46 reaches the predetermined PHA concentration. In this manner, the invention ensures continuous availability of fresh glycol solution for the QCS system 38 for collection of PHAs from the gas passing out of the kiln 20.

The following examples are provided to further illustrate various aspects of the invention but are not intended to limit its scope. Unless otherwise indicated, all percentages are by weight and all temperatures are given in degrees Celsius.

EXAMPLE 1

A soil sample weighing about 550 grams was spiked with about 0.275 g of a mixture of PCBs having an average chlorine content of about 60 wt. % distributed under the trademark AROCLOR 1260 by Monsanto. The resulting PCB concentration was at least about 500 ppm. The sample was heated in a container from room temperature to about 550° C. over a 15 minute interval, and then held steady at about 550° C. for an additional 20 minutes. The container was equipped with a recirculating spray scrubber/receiver for condensation and collection of condensible material vaporized from the soil during the heating process.

The liquid used for the scrubber consisted of 700 ml of PEG400 and 100 ml of water. The temperature of the liquid entering the scrubber was maintained at about 55° C.

After completion of the soil heating process, the weight of the soil was about 509 grams and the PCB concentration had dropped to <0.4 ppm.

EXAMPLE 2

Approximately 800 ml of the liquid collected in the scrubber of Example 1 was heated at about 125° C. for approximately one hour in a distillation apparatus to remove substantially all water from the solutions. The distillate contained about 0.2 µg/ml AROCLOR 1260.

The still bottoms (approximately 700 g) had a pH of about 4.5 and were treated in the same distillation apparatus by mixing with 35 grams of KOH pellets and heating at about 150° C. for about 1 hour.

After the KOH treatment, the still bottoms were neutralized using 220 ml 3N H$_2$SO$_4$. The resulting material was separated by settling and the use of a centrifuge into a 680 ml light glycol-containing phase and the balance was a sludge or heavy solids phase. The glycol phase contained <0.5 µg/ml AROCLOR 1260 and the heavy phase contained <1.0 µg/g AROCLOR 1260.

EXAMPLE 3

A 513 gram soil sample of the composition of Example 1 was heated in the container described therein for 20 minutes at about 550° C. The scrubbing liquid consisted of 670 ml of the glycol phase recovered from the treatment of the soil sample in Example 2 together with 180 ml of added water. The conditions were maintained the same as in Example 1.

The pH of the liquid in the scrubber after the heating process was about 2. The solids contained <0.4 ppm AROCLOR 1260 after heating.

EXAMPLE 4

The water was distilled from the liquid remaining in the scrubber of Example 3 in the manner described in Example 2. The still bottoms were treated in the same apparatus by adding about 40 grams of KOH pellets and heating at 150° C. Samples were taken for analysis at approximately 1 hour, 2 hours, 4 hours, and 8 hours into the treatment. The AROCLOR 1260 levels in the samples were 90.7, <6.0, <6.0, and <1.0 µg/ml, respectively.

Although preferred embodiments of the invention have been described in the foregoing detailed description, it will be understood that the invention may take various forms in practice and is capable of numerous rearrangements, modifications, substitutions and other changes without departing from the scope and spirit of the appended claims.

What is claimed:

1. A method for treating particulate material contaminated with PHAs which comprises vaporizing the PHAs from the material, collecting the vaporized PHAs within a carrier gas, and contacting the carrier gas containing the vaporized PHAs with a solvent solution containing a glycol of the formula

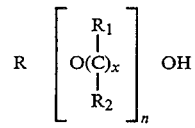

wherein x is $\geq 2$ and n is an integer of 2 to 400; R is a hydrogen, a straight or branched-chain C$_1$–C$_{20}$ alkyl, aralkyl or acyl group, R$_1$ and R$_2$ are the same or different and are hydrogen, straight or branched-chain alkyl, unsubstituted or substituted by C$_5$–C$_8$ cycloalkyl or aryl group, and wherein the contacting takes place under conditions such that the PHAs are condensed from the gas and dissolved in the glycol in the solution, and thereby separated from the carrier gas.

2. The method of claim 1, further comprising removing the PHAs from the solution and reusing the glycol to dissolve additional PHAs from the carrier gas.

3. The method of claim 1 or 2 wherein the particulate material contains water which is vaporized from the material with the PHAs and wherein the glycol is substantially miscible with water so that the water becomes dissolved in the glycol in the solution along with the PHAs so that essentially a single liquid phase exists containing the PHAs, the glycol and the water.

4. The method of claim 3 wherein the water that is dissolved in the glycol in the solution is separated from the solution prior to removing the PHAs therefrom.

5. The method of claim 3 wherein the PHAs are removed from the solution by initially substantially separating the water from the solution and then contacting the solution with a compound selected from the class consisting of alkali metal hydroxides and alkali metal alkoxides to cause the PHAs to be destroyed without substantially adversely affecting the glycol, and resulting in the presence of halide ions and alkali metal ions in the solution.

6. The method of claim 5, further comprising contacting the solution containing halide ions and alkali metal ions with a mineral acid to neutralize the solution and cause halide ions and alkali metals ions to combine as a substantially insoluble alkali metal halide which precipitates from the solution.

7. The method of claim 1 further comprising contacting the solution containing the PHAs with a compound selected from the class consisting of alkali metal hydroxides and alkali metal alkoxides to cause the PHAs to be destroyed without substantially adversely affecting the glycol, and resulting in the presence of alkali metal ions and halide ions in the solution; and thereafter causing the alkali metal ions and halide ions to combine to form an insoluble salt which precipitates from the solution, and reusing the glycol to dissolve additional PHAs from the carrier gas.

8. The method of claim 1, wherein the glycol is selected from the class consisting of polyglycols and glycol ethers.

9. The method of claim 8, wherein the glycol is a polyethylene glycol having an average molecular weight of about 400.

10. A method for treating particulate matter contaminated with PHAs which comprises vaporizing the PHAs from the particulate matter, collecting the vaporized PHAs within a carrier gas, contacting the carrier gas containing the vaporized PHAs with a solution containing a polyglycol of the formula $$HO \left[ \begin{array}{cc} H & R \\ | & | \\ C-C-O \\ | & | \\ H & H \end{array} \right]_n H$$

where R is hydrogen or an alkyl group and wherein the contacting takes place under conditions such that the PHAs are dissolved in the glycol in the solution, contacting the solution containing the polyglycol and PHAs with a compound selected from the class consisting of alkali metal hydroxides and alkali metal alkoxides to cause the PH is to be destroyed without substantially adversely affecting the polyglycol resulting in the presence of halide ions and alkali metal ions within the solution, causing the alkali metal ions and halogen ions in the solution to combine to form an insoluble salt which precipitates from the solution, and thereafter reusing the polyglycol for dissolving PHAs vaporized from the particulate matter.

11. A method for treating particulate matter contaminated with PHAs which comprises vaporizing the PHAs from the particulate matter, sweeping the vaporized PHAs from the particulate matter in a carrier gas, flowing the carrier gas containing the vaporized PHAs through a gas/liquid contacting device in contact with a scrubbing solution containing a glycol of the formula $$R \left[ \begin{array}{c} R_1 \\ | \\ O(C)_x \\ | \\ R_2 \end{array} \right]_n OH$$

wherein x is $\geq 2$ and n is an integer of 2 to 400; R is a hydrogen, a straight or branched-chain $C_1$-$C_{20}$ alkyl, aralkyl or acyl group; $R_1$ and $R_2$ are the same or different and are hydrogen, straight or branched-chain alkyl, unsubstituted or substituted by $C_5$-$C_8$ cycloalkyl or aryl group and wherein the contacting takes place under conditions such that the PHAs are condensed and are dissolved in the glycol in the solution and are thereby separated from the carrier gas, recirculating the scrubbing solution containing the glycol and PHAs to the gas/liquid contacting device for separation of additional PHAs from the carrier gas resulting in a gradual increase in the concentration of PHAs contained in the glycol in the scrubbing solution, replacing the scrubbing solution that is recirculated to the gas/liquid contacting device with a fresh scrubbing solution containing a lower concentration of PHAs than the concentration of PHAs with the recirculated scrubbing solution, contacting the replaced scrubbing solution containing the glycol and PHAs dissolved therein with a compound selected from the class consisting of alkali metal hydroxides and alkali metal alkoxides under conditions such that the PHAs therein are destroyed without substantially adversely affecting the glycol resulting in the presence of halide ions and alkali metal ions within the solution, thereafter causing the halide ions and alkali metal ions to combine to form a substantially insoluble salt which precipitates from the solution, and thereafter separating the precipitated salt from the solution, whereby the PHAs are removed from the glycol in the replaced scrubbing solution so that it may be reused to provide the fresh scrubbing solution of a lower concentration of PHAs that is employed to replace the recirculating scrubbing solution in which the concentration of PHAs is increasing.

* * * * *